United States Patent [19]

Yamamoto

[11] Patent Number: 5,055,322
[45] Date of Patent: Oct. 8, 1991

[54] METHOD OF PRODUCING MAGNETIC RECORDING MEDIA

[75] Inventor: Haruhisa Yamamoto, Yokohama, Japan

[73] Assignee: Nippon Zeon Co., Ltd., Tokyo, Japan

[21] Appl. No.: 603,341

[22] Filed: Oct. 26, 1990

[30] Foreign Application Priority Data

Nov. 2, 1989 [JP] Japan .................................. 1-284917
Feb. 22, 1990 [JP] Japan .................................. 2-39622

[51] Int. Cl.$^5$ .............................................. H01F 10/02
[52] U.S. Cl. ..................................... 427/128; 427/130; 427/132
[58] Field of Search ...................... 427/128, 132, 130

[56] References Cited

FOREIGN PATENT DOCUMENTS

| | | |
|---|---|---|
| 56-60001 | 5/1981 | Japan . |
| 56-149328 | 11/1981 | Japan . |
| 57-56326 | 4/1982 | Japan . |
| 60-95902 | 5/1985 | Japan . |
| 60-157718 | 8/1985 | Japan . |
| 61-168532 | 7/1986 | Japan . |
| 62-207720 | 9/1987 | Japan . |
| 62-216922 | 9/1987 | Japan . |
| 62-235220 | 10/1987 | Japan . |
| 63-64626 | 3/1988 | Japan . |

*Primary Examiner*—Bernard Pianalto
*Attorney, Agent, or Firm*—Lowe, Price, LeBlanc & Becker

[57] ABSTRACT

Disclosed herein is a method of producing a magnetic recording medium, wherein a magnetic coating formulation containing a hexagonal ferrite magnetic powder is applied to the surface of a substrate. It is characterized in that the hexagonal ferrite magnetic powder is represented by the following general composition formula [I] and has an average particle diameter of at most 0.1 μm, a ratio of the maximum diameter to the maximum thickness (a plate ratio) of at most 15, a particle size distribution ($\sigma gd$) of at most 3.4 in terms of the geometric standard deviation based on the number and a coercive force of 200–3,000 oe, and a solvent containing at least 15 wt. % of at least one ketone compound having at most 10 carbon atoms is used in the magnetic coating formulation.

$$(Fe)_a(Co)_b(M^1)_c(M^2)_d(M^3)_e(O)_f \qquad [I]$$

wherein $M^1$ means at least one metal element selected from Ba, Sr, Ca and Pb, $M^2$ denotes at least one metal element selected from Ti, Zr, Hf, Si, Ge, Sn, Mn, Mo, W, V, Ce, Nd, Sm, B and Nb, $M^3$ stands for at least one metal element selected from Mg, Ni, Cr, Cu, Zn, Cd, In, Ga, Bi, La, Y, P, Sb, and Al, a, b, c, d, e and f respectively represent the numbers of Fe, Co, $M^1$, $M^2$, $M^3$ and O atoms, a is a number of 8.0 to 12.0, b is a number of 0 to 0.5, a ratio of b to a is at most 0.055, c is a number of 0.3 to 6.0, d and e are individually a number of 0 to 6.0 with the proviso that when b is a number other than 0 and $M^2$ is Ti alone, e is a number other than 0, d+e is a number of 0.1 to 8.0, and f is the number of oxygen atoms satisfying the atomic valences of the other elements.

7 Claims, No Drawings

METHOD OF PRODUCING MAGNETIC RECORDING MEDIA

FIELD OF THE INVENTION

This invention relates to a method of producing a magnetic recording medium. More specifically, this invention is concerned with a method of producing a high-density magnetic recording medium using a hexagonal ferrite magnetic powder composed of fine particles.

According to the production method of this invention, a magnetic recording medium having a coercive force controlled to a desired degree with good precision can be produced. The method is therefore suitable, in particular, for use as a production method for high-density magnetic recording media.

BACKGROUND OF THE INVENTION

In recent years, high-density magnetic recording media obtained by coating the surface of a substrate with a hexagonal ferrite magnetic powder having uniaxitial magnetocrystalline anisotropy have attracted a great deal of attention.

There is an advance in development, in particular, of magnetic recording media with a Co-substituted barium ferrite magnetic powder applied to the surface of a substrate, for example, of floppy disks, hard disks and magnetic tapes. The Co-substituted barium ferrite magnetic powder can be obtained by substituting Co for part of Fe, thereby reducing the coercive force (in general, about 5,000 Oe) inherent in barium ferrite to a coercive force (200-3,000 Oe) suitable for use as magnetic recording media.

By the way, when industrially mass-producing magnetic recording media, the variation tolerance in coercive force of an intended magnetic recording medium is required to be within (the preset value ±20) Oe from the necessity of keeping the quality of various characteristics and properties, including electromagnetic conversion characteristics, constant.

In order to control the coercive force of a magnetic recording medium with such good precision, the following conditions are required. Namely, (1) the coercive force of a magnetic powder used is stable and keeps a constant value and (2) when a magnetic coating formulation containing this magnetic powder is dispersed and coated on the surface of a substrate to form a magnetic recording medium, a coercive force forecast is not varied.

However, it has been known that with respect to conventionally known Co-substituted barium ferrite magnetic powders containing Co in a great amount, their coercive forces are varied due to agglomeration caused by magnetostatic interaction between particles of the magnetic powders [Yokoyama, et al., Journal of the Magnetics Society of Japan, Vol. 13, No. 3, pp. 488-489 (1989)].

Namely, as indicated in the simultaneously rotating model of the Stoner-Wohlfarth's magnetization, ultrafine particles of the barium ferrite are susceptible to the magnetostatic interaction between the particles of the magnetic powder because the crystalline anisotropic magnetic field ($H_A$) and the anisotropic magnetic field ($H_K$) of the magnetic particles are decreased to a great extent by the substitution of Co. Therefore, the coalescence and agglomeration of the magnetic particles tend to occur and the coercive force varies in a wide range depending upon their coalescent states.

In deed, as shown in Table 1, the conventionally known Co-substituted barium ferrite magnetic powders have the same composition, but their coercive forces are different from one another in a wide range.

In addition, the present inventor was found that when Co-substituted barium ferrite magnetic powders are treated for the purpose of adjusting their water contents or improving their dispersibility, their coercive forces vary greatly depending on the states of the magnetic powders after treatment even in those of the same preparation lot (see Comparative Example 1 which will be described subsequently).

As apparent from these facts, the coercive forces of the known Co-substituted barium ferrite magnetic powders proposed to use as magnetic recording media and containing a relatively great amount of Co vary depending on their coalescent states and the like. It is therefore impossible to satisfy the above-mentioned requirement that the coercive force is stable and keeps a constant value.

TABLE 1

| JPO | Example No. | Barium ferrite composition | Magnetic properties | |
|---|---|---|---|---|
| | | | Hc (Oe) | σs (emu/g) |
| 149328/81 | Example 1 | $Ba_{1.2}Fe_{10.4}Co_{0.8}Ti_{0.8}$ | 870 | 47 |
| 60002/81 | Example | $Ba_{1.2}Fe_{10.4}Co_{0.8}Ti_{0.8}$ | 950 | 58 |
| 56326/82 | Example | $Ba_{1.2}Fe_{10.4}Co_{0.8}Ti_{0.8}$ | 1300 | 60 |
| 95902/85 | Example 2 | $Ba_{1.2}Fe_{10.4}Co_{0.8}Ti_{0.8}$ | 680 | 39 |

Note:
JPO stands for Japanese Patent Application Laid-Open No.

In addition, magnetic recording media making separate use of the conventionally known Co-containing hexagonal barium ferrite magnetic powders are accompanied by a problem that the coercive forces of the magnetic powders used vary greatly from those of the magnetic recording media formed therefrom.

For example, as shown in Table 2, the coercive forces of the magnetic recording media increase to about at least 1.1 times, and sometimes, about 2.0 times the coercive forces of their corresponding Co-containing hexagonal barium ferrite magnetic powders used and moreover, since the degree of variation in coercive force differs with compositions, it is impossible to accurately forecast a relation between the coercive force of each of the magnetic powders and the coercive force of the magnetic recording medium produced therefrom. It is hence very difficult to satisfy the above-mentioned requirement that when a magnetic coating formulation containing a magnetic powder is dispersed and coated on the surface of a substrate to form a magnetic recording medium, a coercive force forecast is not varied.

For this reason, it is difficult to industrially mass-produce magnetic recording media having a fixed quality from any Co-containing barium ferrite magnetic powders by any conventional methods.

TABLE 2

| JPO | Co-containing hexagonal barium ferrite magnetic powder | Coercive force of magnetic powder, Hc (Oe) | Coercive force of magnetic recording medium, Hc (Oe) | Hc of Tape/ Hc of magnetic powder |
|---|---|---|---|---|
| 157718/85 | $Ba_{1.0}Fe_{8.0}Co_{0.40}$ | 1110 | 1210 | 1.09 |
| 168532/86 | $Ba_{1.0}Fe_{10.4}Co_{0.80}Ti_{0.80}$ | 845 | 925 | 1.09 |
| 207720/87 | $Ba_{1.0}Fe_{5.73}Co_{0.42}Ti_{0.42}Si_{0.1}$ | 515 | 652 | 1.27 |
| 216922/87 | $Ba_{1.0}Fe_{10.2}Co_{0.9}Ti_{0.45}Sn_{0.45}$ | 550 | 800 | 1.45 |
| 235220/87 | $Ba_{1.0}Fe_{6.93}Co_{0.53}Ti_{0.53}$ | 1310 | 1450 | 1.11 |
| 64626/88 | Co-substituted barium ferrite | 550 | 620 | 1.13 |

Note:
JPO stands for Japanese Patent Application Laid-Open No.

Further, the above-cited literature [Yokoyama, et al., Journal of the Magnetics Society of Japan, Vol. 13, No. 3, pp. 488-489(1989)]suggests that the coercive force of barium ferrite magnetic powder varies depending upon the coalescent state (dispersibility) of the magnetic powder even when using any substituting elements without limiting to Co so long as they are elements capable of reducing the coercive force of the magnetic powder. In other words, it suggests that any barium ferrite magnetic powders having a coercive force reduced to a value suitable for use as magnetic recording media are varied in coercive force depending upon their coalescent states.

Accordingly, it is very difficult to industrially mass-produce magnetic recording media having the same quality from any substituted hexagonal ferrite magnetic powders, whose coercive forces have been reduced, by the conventional methods.

OBJECT AND SUMMARY OF THE INVENTION

It is an object of this invention is to provide a production method of a magnetic recording medium in which when a hexagonal ferrite magnetic powder, whose coercive force has been reduced to a level suitable for use in magnetic recording, is dispersed and coated on the surface of a substrate to form the magnetic recording medium, the coercive force varies only a little.

The present inventor has carried out an extensive investigation with a view toward attaining this object. As a result, it has surprisingly been found that (a) hexagonal ferrite magnetic powders containing specific elements within specified composition ranges and having the specified ranges of properties as to magnetic powder, of all magnetic powders, is varied in coercive force only to such a little degree that their variations in coercive force substantially pose no problem, under ordinary conditions and (b) when each of these magnetic powders is used together with a solvent containing at least one specified organic compound to prepare a magnetic coating formulation and the magnetic coating formulation is applied to the surface of a substrate into a magnetic recording medium, a great variation does not occur between the coercive force of the magnetic powder and that of the magnetic recording medium produced. Moreover, it has been found that even when the hexagonal ferrite magnetic powder contains Co as a substituting element, the coercive force of the resulting magnetic recording medium ca be controlled with good precision.

The present invention has been led to completion on the basis of these findings.

According to this invention, there is thus provided a method of producing a magnetic recording medium in which a magnetic coating formulation containing a hexagonal ferrite magnetic powder is applied to the surface of a substrate, characterized in that the hexagonal ferrite magnetic powder is represented by the following general composition formula [I]and has an average particle diameter of at most 0.1 μm, a ratio of the maximum diameter to the maximum thickness (a plate ratio) of at most 15, a particle size distribution ($\sigma$gd) of at most 3.4 in terms of the geometric standard deviation based on the number and a coercive force of 200-3,000 Oe, and a solvent containing at least 15 wt. % of at least one ketone compound having at most 10 carbon atoms is used in the magnetic coating formulation.

$$(Fe)_a(Co)_b(M^1)_c(M^2)_d(M^3)_e(O)_f \qquad [I]$$

wherein $M^1$ means at least one metal element selected from Ba, Sr, Ca and Pb, $M^2$ denotes at least one metal element selected from Ti, Zr, Hf, Si, Ge, Sn, Mn, Mo, W, V, Ce, Nd, Sm, B and Nb, $M^3$ stands for at least one metal element selected from Mg, Ni, Cr, Cu, Zn, Cd, In, Ga, Bi, La, Y, P, Sb and Al, a, b, c, d, e and f respectively represent the numbers of Fe, Co, $M^1$, $M^2$, $M^3$ and O atoms, a is a number of 8.0 to 12.0, b is a number of 0 to 0.5, a ratio of b to a is at most 0.055, c is a number of 0.3 to 6.0, d and e are individually a number of 0 to 6.0 with the proviso that when b is a number other than 0 and $M^2$ is Ti alone, e is a number other than 0, d +e is a number of 0.1 to 8.0, and f is the number of oxygen atoms satisfying the atomic valences of the other elements.

The most feature of the magnetic recording medium produced in accordance with this invention resides in that there is little variation in coercive force between the magnetic powder used and the resulting magnetic recording medium. It is therefore possible to easily produce a magnetic recording medium having a fixed quality controlled within a variation tolerance in coercive force of (the preset value ±20) Oe by merely using a magnetic powder having substantially the same coercive force as the preset value.

The magnetic powders useful in the practice of this invention are varied in coercive forces only to such a little degree that their variations in coercive force substantially pose no problem, under ordinary conditions if their coalescent states change. It is hence possible to choose a magnetic powder suitable for an intended magnetic recording medium.

DETAILED DESCRIPTION OF THE INVENTION

Features of the present invention will hereinafter be described in detail.

Magnetic powder

The magnetic powder useful in the practice of this invention is a multi-element hexagonal ferrite having the composition represented by the above described general composition formula [I].

It is critical in this invention that the numbers a to f of the individual constituent elements of the magnetic powder should be within the above-specific ranges. If these numbers are outside the specific ranges, it is difficult to produce magnetic recording media substantially free of any variations in coercive force, which are intended in this invention.

Preferred proportions of the individual components are such that a is 8.0 to 12.0, b is a number of 0 to 0.4, a ratio of b to a is at most 0.05, c is a number of 0.3 to 4.0, d is a number of 0 to 4.0, e is a number of 0 to 4.0 with the proviso that when b is a number other than 0 and $M^2$ is Ti alone, e is a number other than 0, $d + e$ is a number of 0.2 to 5.0, and f is the number of oxygen atoms satisfying the atomic valences of the other elements in the general composition formula [I].

If the magnetic powder used in this invention contains Co, the object of this invention can be attained so long as it contains the constituent elements and falls within the composition range, both, specified in the general composition formula [I]. If Co is present in a compositional proportion higher than that specified in the present invention, it is impossible to attain the object of this invention, that is to say, the coercive force of a magnetic powder is stable and keeps a constant value, and when the magnetic powder is dispersed and coated on the surface of a substrate as a magnetic coating formulation to form a magnetic recording medium, a coercive force forecast is not varied.

Moreover, with respect to the magnetic powders useful in the practice of this invention, the properties as to powder are important.

First of all, the average particle diameter of the maximum diameters of hexagonal plate crystals must be at most 0.1 μm. If the average particle diameter of the magnetic powder exceeds 0.1 μm, its coercive force is stable, but the variation in coercive force becomes a nonnegligible degree when a magnetic recording medium is produced therefrom in accordance with the method of this invention.

The plate ratio (a quotient obtained by dividing the maximum diameter of the hexagonal plate crystal by its maximum thickness) must be at most 15, preferably at most 10. If the plate ratio exceeds 15, the magnetic powder is very thin and hence tends to agglomerate, so that both coercive forces of the magnetic powder and magnetic recording medium produced therefrom become more unstable as the degree of the agglomeration increases.

The particle size distribution ($\sigma$gd) in terms of the geometric standard deviation based on the number must be at most 3.4, preferably at most 3.1. If $\sigma$gd exceeds 3.4 and the particle size distribution is hence wide, the magnetic powder tends to agglomerate and at the same time, the coercive force distribution of the magnetic powder also becomes wider. As a result, the coercive force of the magnetic powder tends to become unstable and moreover, the coercive force of the magnetic recording medium produced therefrom also tends to vary and hence becomes unstable.

By the way, these properties of the powder are obtained by statistically arranging the measurements obtained about at least 400 particles of each magnetic powder, which have been sampled at random. With respect to the shape of the magnetic powder on the other hand, it does not necessarily exhibit the form of a regular hexagonal plate in some cases, depending upon its composition, production conditions and/or the like. However, no particular problem arises so long as it falls within the scope of the magnetic powder defined in this invention.

The coercive force of the magnetic powder must be controlled within a range of 200–3,000 Oe, which permits magnetic recording.

No particular limitation is imposed on the production method of the hexagonal ferrite magnetic powder useful in the practice of this invention, and any suitable production method may be used. As exemplary production methods, may be mentioned a coprecipitation method, flux method, coprecipitation-flux method, hydrothermal synthesis method, glass crystallization method and the like.

Magnetic coating formulation

The magnetic coating formulation is generally prepared by dispersing and kneading the magnetic powder together with a dispersant, solvent, binder and one or more other additives.

In this invention, the magnetic coating formulation can be prepared by a method known per se in the art except that the method requires that the magnetic powder is a specific hexagonal ferrite magnetic powder described above and the solvent contains at least 15 wt. % of at least one ketone compound having at most 10 carbon atoms.

In the magnetic coating formulation, there has heretofore been used, as a single solvent or mixed solvent, for example, ketones such as acetone, methyl ethyl ketone, methyl isobutyl ketone and cyclohexanone; esters such as ethyl formate, ethyl acetate and butyl acetate; alcohols such as methanol, ethanol, isopropanol and butanol; aromatic hydrocarbons such as toluene, xylene and ethylbenzene; ethers such as isopropyl ether, ethyl ether and dioxane; furans such as tetrahydorfuran and furfural; and the like.

However, the solvent useful in the practice of this invention must contain at least 15 wt. % of at least one ketone compound (hereinafter may referred to as a "ketone") having at most 10 carbon atoms. If the solvent used contains no ketone compound or, if contained, its amount is less than 15 wt. %, the coercive force of a resulting magnetic recording medium becomes unstable and it is hence difficult to forecast the coercive force of the resulting magnetic recording medium from the coercive force of the magnetic powder. A preferred amount of the ketone(s) contained in the solvent is 15–90 wt. %.

As exemplary ketones used in this invention and having at most 10 carbon atoms, may be mentioned acetone, methyl ethyl ketone, methyl isobutyl ketone, cyclohexanone, methyl n-propyl ketone, diethyl ketone, hexanone-2, hexanone-3, di-n-propyl ketone, diisopropyl ketone, diisobutyl ketone, di-n-amyl ketone, acetylacetone, phorone, cyclopentanone, cycloheptanone and the like.

As the binder, may be suitably used various resins such as vinyl chloride-vinyl acetate copolymers, polyurethane resins, phenol resins and epoxy resins.

As the dispersant, may be used a wide variety of dispersants such as various fatty acids and lecithins.

It is necessary to thoroughly disperse the magnetic powder by means of a dispersing machine such as a ball mill, sand mill or triple roll mill upon the preparation of the magnetic coating formulation.

The production of a magnetic recording medium may be conducted in accordance with a method known per se in the art. For example, it is only necessary to add suitably a hardening agent such as an isocyanate to the magnetic coating formulation, apply the resulting mixture by a coater such as a reverse-roll coater, gravure coater or spin coater to a substrate, for example, a polyethylene terephthalate film, subject the resulting coating film to an orientation treatment by a magnetic field in a horizontal or perpendicular direction as needed, dry the thus-treated substrate, subject it to a surface-forming treatment, cure and age the thus-treated substrate, polish it as needed and then cut it into desired pieces. It is of course possible to provide a back coat and/or a top coat, if necessary.

ADVANTAGES OF THE INVENTION

Since the variation in coercive force of the magnetic recording medium obtained in accordance with the method of the present invention from the magnetic powder used is extremely small, it is possible to substantially control the variation tolerance in coercive force of an intended magnetic recording medium within (the preset value ±20 Oe) by suitably choosing the coercive force of the magnetic powder used according to the desired coercive force of the magnetic recording medium.

The fact that the coercive force of the magnetic recording medium can be controlled with good precision, as described above, is a surprising advantage quite unpredictable from the findings and suggestions from the conventional literature.

Owing to this invention, it has been possible to industrially mass-produce magnetic recording media having the same quality using the hexagonal ferrite magnetic powders.

EMBODIMENTS OF THE INVENTION

The present invention will hereinafter be described more specifically by the following Examples and Comparative Examples. However, it should be borne in mind that this invention is not limited to the following Examples only. Incidentally, all designations of "part" or "parts" and "%" as will be used in the Examples and Comparative Examples mean part or parts by weight and wt. % unless otherwise provided.

Preparation of Magnetic Powders

Magnetic powders having their corresponding compositions shown in Table 3 were prepared in accordance with the coprecipitation-flux method.

In each of the magnetic powders, its water content is 0.6% (supposing the water content where the magnetic powder is vacuum-dried at 150° C. for 20 hours is 0%). By the way, in the composition formulae of the magnetic powders in Table 3, the atomic ratios of the elements were expressed by those of the elements at the time og preparing the starting materials, and the indication of oxygen was omitted for simplification.

Production of Magnetic Recording Media

Magnetic recording media described in the following Examples and Comparative Examples were produced by the following process.

Namely, a sample magnetic powder in an amount of 100 parts by weight was mixed thoroughly with 10 parts of a binder for magnetic tape ("MR-110", trade name; product of Nippon Zeon Co., Ltd.), 10 parts of a polyurethane resin, 3 parts of conductive carbon black, 5 parts of highly purified alumina powder, 1.2 parts of additives such as stearic acid and 150 parts of one of the following various solvents to prepare a magnetic coating formulation. The magnetic coating formulation was applied by a roll coater to a polyethylene terephthalate film without any orientation. The thus-coated polyethylene terephthalate film was dried and then caused to pass through between calender rolls. Thereafter, the thus-treated film was slitted into strips of ½ inch wide, thereby obtaining magnetic tapes.

| Solvents for the magnetic coating formulations: | |
|---|---|
| Solvent 1: (Ketone compound content = 85%) | |
| Methyl ethyl ketone | 40% |
| Cyclohexanone | 45% |
| Toluene | 15% |
| Solvent 2: (Ketone compound content = 50%) | |
| Methyl isobutyl ketone | 10% |
| Cyclohexanone | 40% |
| Toluene | 40% |
| Tetrahydrofuran | 10% |
| Solvent 3: (Ketone compound content = 20%) | |
| Methyl ethyl ketone | 5% |
| Cyclohexanone | 15% |
| Toluene | 60% |
| Tetrahydrofuran | 20% |
| Solvent 4: (Ketone compound content = 12%) | |
| Methyl ethyl ketone | 6% |
| Cyclohexanone | 6% |
| Toluene | 50% |
| Tetrahydrofuran | 38% |
| Solvent 5: (Ketone compound content = 10%) | |
| Methyl isobutyl ketone | 2% |
| Cyclohexanone | 8% |
| Toluene | 50% |
| Tetrahydrofuran | 40% |

Measurements of Physical Properties and Others

Various physical properties and characteristics in the Examples and Comparative Examples were measured in accordance with the following methods.

Coercive Force (Hc) and Saturation Magnetization ($\sigma s$) of Magnetic Powder The coercive forces and saturation magnetizations in these examples were measured by using a vibrating sample magnetometer (VSM) at a maximum applied magnetic field of 10 KOe and a measuring temperature of 28° C.

Average Particle Diameter (D) and Plate Ratio (D/L):

The maximum diameters and maximum thicknesses of at least 400 particles were measured from a micrograph of the magnetic powder taken through a transmission-type electron microscope to calculate the average particle diameter and the ratio of the maximum diameter to the maximum thickness (the plate ratio) as arithmetic averages.

Particle Size Distribution ($\sigma gd$):

According to the above measurements of the average particle diameter and plate ratio, the particle size distribution ($\sigma gd$) in terms of the geometric standard deviation based on the number was determined. The calculation formula of $\sigma gd$ is as follows:

$$\sigma dg = \frac{\text{Cumulative undersize 84.13\% diameter } (du_{84.13})}{\text{Median particle diameter } (d_{50})}$$

Both $d_{50}$ and $du_{84.13}$ were determined from a logarithmic normal distribution histogram.

Coercive Force (Hc⊥) of Magnetic Tape

The coercive force in a perpendicular direction of each magnetic tape was measured by using the vibrating sample magnetometer (VSM) at a maximum applied magnetic field of 5 KOe (a measuring temperature: 28° C.).

TABLE 3

| Magnetic powder No. | Composition of magnetic powder (atomic ratio) | Hc (Oe) | σs (emu/g) | D (Å) | D/L | σgd |
|---|---|---|---|---|---|---|
| (1) | $Ba_{1.1}Fe_{10.9}Zr_{0.7}Ni_{0.7}W_{0.4}$ | 596 | 57 | 720 | 7.9 | 2.8 |
| (2) | $Ba_{1.1}Fe_{10.6}Zr_{0.6}Cu_{0.8}Si_{0.5}$ | 734 | 56 | 630 | 3.8 | 2.4 |
| (3) | $Ba_{1.5}Fe_{11.0}Ti_{0.5}Si_{2.0}Ni_{0.5}$ | 1250 | 58 | 610 | 4.3 | 2.3 |
| (4) | $Ba_{1.1}Fe_{10.2}Sn_{0.9}Ni_{0.9}$ | 752 | 55 | 540 | 2.3 | 2.1 |
| (5) | $Ba_{1.9}Fe_{11.2}Sn_{0.4}Zn_{0.4}La_{0.1}Si_{1.4}$ | 1440 | 57 | 590 | 2.9 | 2.4 |
| (6) | $Ba_{1.2}Fe_{10.6}Zr_{0.5}Cu_{0.7}Ti_{0.2}Si_{0.5}$ | 741 | 54 | 530 | 3.3 | 2.4 |
| (7) | $Ba_{1.1}Fe_{10.2}Zr_{0.9}Cr_{0.9}$ | 1680 | 53 | 880 | 6.3 | 2.9 |
| (8) | $Ba_{1.1}Fe_{10.0}Ti_{1.1}Zn_{1.1}$ | 415 | 57 | 570 | 3.1 | 2.3 |
| (9) | $Ba_{0.9}Fe_{10.5}Ti_{1.5}Cu_{0.5}$ | 1530 | 54 | 750 | 4.7 | 2.6 |
| (10) | $Ba_{1.1}Fe_{11.3}In_{0.7}Si_{3.0}$ | 882 | 51 | 730 | 5.5 | 2.8 |
| (11) | $Ba_{1.1}Fe_{11.0}Zr_{0.5}Mg_{0.5}Si_{0.7}$ | 947 | 55 | 640 | 4.1 | 2.3 |
| (12) | $Ba_{1.1}Fe_{10.4}Si_{1.6}Ni_{0.8}$ | 2760 | 57 | 810 | 5.6 | 2.4 |
| (13) | $Ba_{0.8}Fe_{10.2}Zr_{0.6}Zn_{0.85}$ | 649 | 55 | 700 | 3.5 | 2.7 |
| (14) | $Ba_{1.1}Fe_{11.4}Si_{0.5}La_{0.6}$ | 2560 | 59 | 590 | 3.0 | 2.2 |
| (15) | $Ba_{1.1}Fe_{10.6}Ti_{0.7}Mg_{0.7}Si_{0.5}$ | 845 | 55 | 620 | 4.4 | 2.6 |
| (16) | $Ba_{2.5}Fe_{10.8}Zr_{0.6}Si_{2.5}Zn_{0.4}Ni_{0.2}$ | 713 | 55 | 570 | 3.7 | 2.4 |
| (17) | $Ba_{1.1}Fe_{10.8}Sn_{0.6}Mg_{0.6}Si_{1.8}$ | 1050 | 54 | 680 | 4.8 | 2.3 |
| (18) | $Ba_{1.1}Fe_{11.0}Ti_{1.5}Zr_{0.5}Cu_{0.5}Si_{0.7}$ | 754 | 55 | 600 | 3.4 | 2.3 |
| (19) | $Ba_{1.1}Fe_{10.4}Sn_{0.8}Mg_{0.8}Ti_{0.6}Si_{0.3}$ | 311 | 52 | 610 | 3.1 | 2.4 |
| (20) | $Ba_{1.1}Fe_{11.0}Sn_{0.9}Al_{4.0}Cu_{0.9}$ | 358 | 53 | 730 | 3.4 | 2.4 |
| (21) | $Ba_{1.1}Fe_{10.7}Sn_{0.65}Si_{0.5}Cu_{0.65}W_{0.1}$ | 725 | 54 | 640 | 3.2 | 2.5 |
| (22) | $Ba_{1.5}Fe_{11.1}Nb_{0.3}Zn_{0.6}Si_{1.0}$ | 833 | 55 | 670 | 3.9 | 2.6 |
| (23) | $Ba_{0.85}Fe_{10.4}Sn_{0.6}Cr_{0.5}Zn_{0.3}$ | 692 | 54 | 720 | 3.5 | 2.3 |
| (24) | $Ba_{1.1}Fe_{11.5}Ti_{1.0}In_{0.5}$ | 1230 | 54 | 770 | 5.1 | 2.8 |
| (25) | $Ba_{1.1}Fe_{10.4}Zr_{0.7}Ni_{0.5}Si_{0.5}Ti_{0.5}$ | 947 | 55 | 610 | 4.7 | 2.4 |
| (26) | $Ba_{1.1}Fe_{10.2}Sn_{0.9}Ti_{0.9}Nd_{0.1}$ | 1680 | 56 | 790 | 5.6 | 3.0 |
| (27) | $Ba_{1.1}Fe_{11.2}Ni_{0.4}Zn_{0.4}Sb_{0.4}$ | 596 | 56 | 540 | 4.0 | 2.5 |
| (28) | $Ba_{1.1}Fe_{11.1}Zr_{0.8}Sn_{0.1}Si_{0.5}$ | 2140 | 54 | 750 | 4.1 | 2.3 |
| (29) | $Sr_{1.1}Fe_{11.6}Sn_{0.4}Mg_{0.4}$ | 1430 | 57 | 890 | 3.8 | 2.8 |
| (30) | $Ba_{0.8}Sr_{0.4}Fe_{10.8}Zr_{0.6}Cu_{0.6}$ | 858 | 55 | 740 | 4.4 | 2.7 |
| (31) | $Ba_{1.0}Pb_{0.5}Fe_{10.4}Si_{1.2}Sn_{0.8}Ni_{0.8}$ | 562 | 55 | 680 | 4.7 | 2.5 |
| (32) | $Pb_{1.1}Fe_{10.0}Sn_{1.0}Mg_{1.0}Si_{3.0}$ | 354 | 54 | 630 | 4.1 | 2.5 |
| (33) | $Ba_{0.9}Ca_{0.3}Fe_{10.2}Zr_{0.9}Ni_{0.2}Cu_{0.7}$ | 489 | 54 | 770 | 5.6 | 2.6 |
| (34) | $Ba_{1.1}Fe_{9.6}Ce_{0.1}Zr_{1.2}Si_{1.5}Cu_{1.2}$ | 677 | 54 | 610 | 4.1 | 2.3 |
| (35) | $Ba_{1.1}Fe_{11.0}Nb_{0.2}Ti_{0.4}Zn_{0.8}Bi_{0.05}$ | 862 | 55 | 580 | 3.6 | 2.4 |
| (36) | $Ba_{1.1}Fe_{11.3}W_{0.1}Sn_{0.3}Ni_{0.3}$ | 2130 | 55 | 720 | 3.3 | 2.4 |
| (37) | $Ba_{2.5}Fe_{11.2}Sn_{0.4}Ge_{2.0}Mg_{0.4}Ga_{0.1}$ | 1540 | 56 | 630 | 5.0 | 2.8 |
| (38) | $Ba_{1.1}Fe_{10.6}Sn_{0.7}Mo_{0.1}Zn_{0.7}Si_{0.8}$ | 981 | 54 | 740 | 4.3 | 2.3 |
| (39) | $Ba_{1.1}Fe_{10.2}Ti_{0.9}Si_{0.5}Mn_{0.1}Ni_{0.4}Zn_{0.4}$ | 656 | 55 | 690 | 4.6 | 2.2 |
| (40) | $Ba_{1.6}Fe_{10.1}V_{0.6}Mn_{0.2}Cd_{0.8}$ | 2810 | 57 | 890 | 9.4 | 3.1 |
| (41) | $Ba_{1.1}Fe_{10.6}Zr_{0.7}Si_{1.5}Sb_{0.3}Cu_{0.4}$ | 728 | 55 | 670 | 5.1 | 2.5 |
| (42) | $Ba_{1.1}Fe_{10.9}Hf_{0.4}Ti_{0.3}Ni_{0.75}Si_{0.9}$ | 833 | 55 | 710 | 4.1 | 2.4 |
| (43) | $Ba_{1.1}Fe_{11.0}Co_{0.3}Sn_{0.5}Mg_{0.2}$ | 544 | 52 | 680 | 6.8 | 2.0 |
| (44) | $Ba_{1.1}Fe_{10.0}Co_{0.2}W_{1.5}Zn_{0.4}$ | 618 | 53 | 550 | 4.4 | 1.9 |
| (45) | $Ba_{1.3}Fe_{11.0}Co_{0.1}Zr_{0.5}Ti_{0.5}Si_{0.5}$ | 955 | 54 | 590 | 3.1 | 2.1 |
| (46) | $Ba_{1.1}Fe_{10.8}Co_{0.4}V_{0.6}La_{0.2}$ | 713 | 53 | 600 | 3.8 | 2.3 |
| (47) | $Ba_{1.1}Fe_{10.1}Co_{0.1}Ti_{0.1}Si_{0.8}Sn_{0.4}Ni_{0.4}Cu_{0.75}Sb_{0.3}$ | 1033 | 51 | 650 | 3.8 | 1.7 |
| (48) | $Ba_{1.5}Fe_{10.5}Co_{0.05}Ti_{0.05}Si_{0.3}Zr_{0.7}Cu_{0.7}$ | 710 | 55 | 580 | 3.4 | 2.9 |
| (49) | $Ba_{1.1}Fe_{11.0}Co_{0.5}Nb_{0.3}Ga_{0.2}$ | 836 | 57 | 730 | 3.5 | 1.6 |
| (50) | $Ba_{1.1}Fe_{11.0}Co_{0.1}Mn_{0.1}Sn_{0.8}Sb_{0.5}$ | 311 | 50 | 510 | 2.9 | 1.5 |
| (51) | $Ba_{1.1}Fe_{11.5}Co_{0.4}Ce_{0.1}Cr_{0.6}$ | 1130 | 52 | 690 | 3.6 | 2.3 |
| (52) | $Ba_{1.8}Fe_{10.4}Co_{0.2}Ti_{0.8}Zr_{0.6}$ | 449 | 50 | 620 | 3.1 | 2.8 |
| (53) | $Ba_{1.1}Fe_{11.0}Co_{0.4}Nd_{0.4}Y_{0.2}$ | 1560 | 56 | 630 | 3.5 | 1.8 |
| (54) | $Ba_{1.7}Fe_{11.2}Co_{0.4}Zr_{0.4}Cu_{0.4}$ | 748 | 53 | 610 | 4.7 | 1.7 |
| (55) | $Ba_{0.8}Pb_{0.4}Fe_{11.0}Co_{0.1}Ti_{0.1}Si_{4.0}Zr_{0.3}Mg_{0.2}Zn_{0.1}$ | 956 | 52 | 670 | 4.4 | 2.4 |
| (56) | $Ba_{1.8}Fe_{10.8}Co_{0.3}Ti_{2.0}Ni_{0.1}$ | 2380 | 59 | 710 | 4.9 | 2.7 |
| (57) | $Ba_{1.1}Fe_{11.0}Co_{0.3}Mo_{0.2}Al_{2.0}$ | 2530 | 57 | 440 | 2.7 | 2.1 |
| (58) | $Ba_{1.1}Fe_{11.0}Co_{0.2}Mg_{0.4}Sb_{0.6}$ | 845 | 56 | 570 | 2.6 | 2.1 |
| (59) | $Pb_{1.1}Fe_{10.4}Co_{0.4}B_{2.0}Mg_{0.4}$ | 937 | 54 | 640 | 4.0 | 2.3 |
| (60) | $Ba_{1.0}Ca_{0.3}Fe_{10.6}Co_{0.2}Si_{1.5}Zr_{0.7}Zn_{0.5}$ | 648 | 56 | 590 | 3.2 | 2.8 |
| (61) | $Ca_{1.1}Fe_{11.4}Co_{0.3}Sm_{0.2}Bi_{0.1}$ | 1944 | 56 | 550 | 3.2 | 2.4 |
| (62) | $Ba_{3.0}Fe_{10.6}Co_{0.2}Si_{4.0}Sb_{0.5}$ | 462 | 53 | 730 | 4.4 | 3.0 |
| (63) | $Ba_{1.1}Fe_{10.8}Co_{0.1}Ti_{0.1}Si_{1.8}Sn_{0.5}Mg_{0.5}$ | 719 | 50 | 680 | 3.1 | 1.9 |
| (64) | $Ba_{1.1}Fe_{10.8}Co_{0.1}Ti_{0.1}Ni_{0.5}Sb_{0.5}$ | 741 | 52 | 610 | 3.3 | 2.2 |
| (65) | $Ba_{1.1}Fe_{11.0}Co_{0.2}Ge_{0.8}P_{0.03}$ | 563 | 52 | 860 | 3.0 | 3.1 |
| (66) | $Sr_{1.1}Fe_{10.4}Co_{0.3}Hf_{0.8}Cd_{0.5}$ | 750 | 51 | 710 | 3.2 | 2.1 |
| (67) | $Ba_{1.1}Fe_{11.3}Co_{0.1}Mn_{0.1}In_{0.5}$ | 975 | 48 | 780 | 5.2 | 1.9 |
| (68) | $Ba_{0.8}Fe_{11.0}Co_{0.2}Ni_{0.4}In_{0.2}$ | 1348 | 53 | 630 | 4.1 | 2.0 |

TABLE 3-continued

| Magnetic powder No. | Composition of magnetic powder (atomic ratio) | Hc (Oe) | σs (emu/g) | D (Å) | D/L | σgd |
|---|---|---|---|---|---|---|
| (69) | $Ba_{1.1}Sr_{1.0}Fe_{10.2}Co_{0.4}W_{1.0}Zn_{0.4}$ | 1260 | 52 | 890 | 6.8 | 2.8 |

Stability on Coercive Forces of Magnetic Powders

Example 1

With respect to the magnetic powders of Magnetic Powder Nos. (2), (3), (8), (11), (17), (36), (43), (45), (47), (54) and (56) shown in Table 3, the following treatments were performed to determine the influence of such treatments on the coercive forces of the magnetic powders. Results are shown in Table 4.

the magnetic powder is applied to the surface of $SiO_2$ to enhance its dispersibility, and hence is very unstable.

Incidentally, portions of the magnetic powders useful in the practice of this invention are exemplified in Table 4. However, the coercive forces of all the magnetic powders within the scope of the present invention are as stable as the examples in Table 4 and there is substantially no variation in coercive force even after the above treatments.

TABLE 4

| Magnetic powder No. | Coercive force, Hc (oe) of magnetic powder | | | | | | | | | | | Comp. Ex. 1 |
|---|---|---|---|---|---|---|---|---|---|---|---|---|
| | Example 1 | | | | | | | | | | | |
| | (2) | (3) | (8) | (11) | (17) | (36) | (43) | (45) | (47) | (54) | (56) | (C-1) |
| Untreated | 734 | 1250 | 415 | 947 | 1050 | 2130 | 544 | 955 | 1033 | 748 | 2380 | 583 |
| Treatment (a) | 731 | 1254 | 415 | 945 | 1050 | 2129 | 541 | 950 | 1034 | 748 | 2385 | 691 |
| Treatment (b) | 733 | 1251 | 414 | 946 | 1048 | 2130 | 538 | 948 | 1030 | 743 | 2381 | 636 |
| Treatment (c) | 733 | 1248 | 411 | 946 | 1052 | 2130 | 546 | 954 | 1031 | 751 | 2384 | 529 |
| Treatment (d) | 735 | 1250 | 411 | 946 | 1052 | 2130 | 551 | 959 | 1036 | 755 | 2378 | 722 |

Treatment of Magnetic Powder (a) magnetic powder was sufficiently dried to control its water content to 0.1%.

(b) The water content of magnetic powder was controlled to 0.4%.

(c) The water content of magnetic powder was controlled to 1.0%.

(d) Magnetic powder in an amount of 2 wt. % was applied to the surface of $SiO_2$ having a diameter of 1 μm.

Comparative Example 1

A Co-containing barium ferrite magnetic powder [Magnetic powder No. (C-1)]represented by the following composition formula was prepared by the coprecipitation-flux method.

$Ba_{1.1}Fe_{10.3}Co_{0.85}Ti_{0.85}$

The magnetic powder had a coercive force, Hc of 583 Oe, a saturation magnetization, σs of 57 emu/g, an average particle diameter, D of 560 Å, a plate ratio, D/L of 3.8 and a particle size distribution, σgd of 2.8.

Regarding the thus-prepared Co-containing barium ferrite magnetic powder, the treatments of (a)–(d) were conducted in the same manner as in Example 1 to determine the influence on its coercive force. Results are also shown in Table 4.

It is understood from the results of Example 1 and Comparative Example 1 that the variations in coercive force of the magnetic powders useful in the practice of this invention are little even after the treatment of (a)–(d) and their coercive forces are hence stable, whereby they are suitable for use in the production of magnetic recording media.

On the other hand, it is appreciated that the coercive force of the conventional Co-substituted barium ferrite magnetic powder prepared in Comparative Example 1 and containing Co in a great amount varies to a significant extent even upon slight changes of the water content of the magnetic powder and moreover even when Stability on Coercive Forces of Magnetic Recording Media Example 2

Magnetic coating formulations were separately prepared using the magnetic powders of Magnetic Powder Nos. (2), (3), (17), (45), (47) and (54) and the magnetic powders obtained by subjecting the above magnetic powders to the treatments (a)–(c) in accordance with Example 1, and their corresponding Solvents 1–3 to produce magnetic recording media in order to determine variations in coercive force of the resulting recording media from those of the corresponding magnetic powders. Results are shown in Table 5.

Incidentally, the "Variation in coercive force of magnetic recording medium" in Table 5 is a quotient obtained by dividing the coercive force of each magnetic recording medium by that of its corresponding untreated magnetic powder.

Comparative Example 2

Using Solvents 4 and 5, the variations in coercive force were determined in the same manner as in Example 2. Results are shown in Table 5.

Moreover, using the conventional Co-substituted barium ferrite magnetic powder (C-1) prepared in Comparative Example 1 and containing Co in a great amount, the variations in coercive force were determined in the same manner as in Example 2 (Solvents 1–5 were used as solvents for this purpose). Results are shown in Table 5.

It is understood from the results of Example 2 and Comparative Example 2 that the coercive forces of the magnetic recording media produced by applying the magnetic coating formulations making use of the magnetic powders according to this invention and their corresponding solvents containing at least 15 wt. % of at least one ketone compound are substantially the same coercive forces of their corresponding magnetic powders used and are very stable.

On the other hand, it is appreciated that when Solvents 4 and 5 containing less than 15 wt. % of at least one ketone compound are used, the coercive forces of the resulting magnetic recording media are unstable.

It is further understood that when the Co-substituted barium ferrite magnetic powder prepared in Comparative Example 1 and containing Co in a great amount is used, the coercive forces of the resulting magnetic recording media vary greatly if the kind of the solvent used and the water content of the magnetic powder are changed, and are very unstable.

TABLE 5

| Magnetic powder No. | Example 2 | | | | | | | | | | | | | | | |
|---|---|---|---|---|---|---|---|---|---|---|---|---|---|---|---|---|
| | (2) | (3) | (17) | (45) | (47) | (54) | (2) | (3) | (17) | (2) | (2) | (45) | (47) | (54) | (45) | (45) |
| Treatment of magnetic powder | *1 | *1 | *1 | *1 | *1 | *1 | (a) | (b) | (c) | (b) | (c) | (a) | (b) | (c) | (b) | (c) |
| Coercive force of magnetic powder after the treatment, Hc (Oe) | 734 | 1250 | 1050 | 955 | 1033 | 748 | 731 | 1251 | 1052 | 733 | 733 | 951 | 1030 | 742 | 950 | 952 |
| Solvent | 1 | 2 | 3 | 1 | 2 | 3 | 2 | 3 | 1 | 3 | 1 | 2 | 3 | 1 | 3 | 1 |
| Coercive force of magnetic recording medium, Hc⊥ (Oe) | 741 | 1252 | 1044 | 961 | 1042 | 755 | 735 | 1248 | 1058 | 736 | 738 | 960 | 1035 | 740 | 962 | 965 |
| Variation in coercive force of magnetic recording medium, Hc⊥/Hc | 1.01 | 1.00 | 0.99 | 1.01 | 1.01 | 1.01 | 1.00 | 1.00 | 1.01 | 1.00 | 1.01 | 1.01 | 1.00 | 0.99 | 1.01 | 1.01 |

| Magnetic powder No. | Comparative Example 2 | | | | | | | | | | | | | | | |
|---|---|---|---|---|---|---|---|---|---|---|---|---|---|---|---|---|
| | (2) | (3) | (17) | (45) | (47) | (54) | (2) | (45) | (C-1) | (C-1) | (C-1) | (C-1) | (C-1) | (C-1) | (C-1) | (C-1) |
| Treatment of magnetic powder | *1 | *1 | *1 | *1 | *1 | *1 | (a) | (a) | *1 | *1 | *1 | *1 | *1 | (a) | (c) |
| Coercive force of magnetic powder after the treatment, Hc (Oe) | 734 | 1250 | 1050 | 955 | 1033 | 748 | 731 | 951 | 581 | 581 | 581 | 581 | 581 | 691 | 529 |
| Solvent | 4 | 5 | 4 | 4 | 5 | 4 | 4 | 4 | 1 | 2 | 3 | 4 | 5 | 1 | 2 |
| Coercive force of magnetic recording medium, Hc⊥ (Oe) | 658 | 1107 | 924 | 1068 | 1244 | 861 | 610 | 1049 | 873 | 885 | 742 | 792 | 498 | 980 | 939 |
| Variation in coercive force of magnetic recording medium, Hc⊥/Hc | 0.90 | 0.89 | 0.88 | 1.12 | 1.20 | 1.15 | 0.83 | 1.10 | 1.50 | 1.52 | 1.28 | 1.36 | 0.86 | 1.69 | 1.62 |

*1: Not treated.

Example 3

Most of the magnetic powders shown in Table 3 and their corresponding Solvents 1, 2 and 3 were used to produce magnetic recording media in order to measure their coercive forces. Results are shown in Table 6.

Comparative Example 3

Some of the magnetic powders shown in Table 3 and their corresponding Solvents 4 and 5 were used to produce magnetic recording media in order to measure their coercive forces. Results are shown in Table 7.

It is understood from the results of Tables 6 and 7 that the magnetic recording media obtained in accordance with the method of this invention have excellent stability on coercive force.

TABLE 6

| Magnetic powder No. | Solvent | Coercive force of magnetic recording medium Hc⊥ (Oe) | Variation in coercive force of magnetic recording medium Hc⊥/Hc |
|---|---|---|---|
| (1) | 1 | 598 | 1.00 |
| (4) | 1 | 744 | 0.99 |
| (5) | 2 | 1455 | 1.01 |
| (6) | 1 | 738 | 1.00 |
| (7) | 3 | 1680 | 1.00 |
| (8) | 1 | 410 | 0.99 |
| (9) | 1 | 1520 | 0.99 |
| (10) | 3 | 893 | 1.01 |
| (11) | 1 | 950 | 1.00 |
| (12) | 1 | 2760 | 1.00 |
| (13) | 1 | 654 | 1.01 |
| (14) | 2 | 2550 | 1.00 |
| (15) | 2 | 857 | 1.01 |
| (16) | 1 | 706 | 0.99 |
| (18) | 1 | 754 | 1.00 |
| (19) | 1 | 309 | 0.99 |
| (20) | 3 | 355 | 0.99 |
| (21) | 1 | 720 | 0.99 |
| (22) | 2 | 845 | 1.01 |
| (23) | 1 | 700 | 1.01 |
| (24) | 1 | 1214 | 0.99 |
| (25) | 1 | 947 | 1.00 |
| (26) | 3 | 1688 | 1.00 |
| (27) | 2 | 601 | 1.01 |
| (28) | 1 | 2142 | 1.00 |
| (29) | 1 | 1427 | 1.00 |
| (30) | 1 | 853 | 0.99 |
| (31) | 1 | 572 | 1.02 |
| (32) | 1 | 361 | 1.02 |
| (33) | 1 | 490 | 1.00 |
| (34) | 2 | 671 | 0.99 |
| (35) | 1 | 863 | 1.00 |
| (36) | 1 | 2132 | 1.00 |
| (37) | 3 | 1525 | 0.99 |
| (38) | 1 | 984 | 1.00 |
| (39) | 1 | 652 | 0.99 |
| (40) | 3 | 2801 | 1.00 |
| (41) | 1 | 730 | 1.00 |
| (42) | 1 | 841 | 1.01 |
| (43) | 1 | 540 | 1.00 |
| (44) | 1 | 626 | 1.01 |
| (46) | 2 | 727 | 1.02 |
| (48) | 3 | 725 | 1.02 |
| (49) | 3 | 851 | 1.02 |
| (50) | 1 | 310 | 1.00 |
| (51) | 2 | 1142 | 1.01 |
| (52) | 1 | 445 | 0.99 |
| (53) | 2 | 1564 | 1.00 |

TABLE 6-continued

| Magnetic powder No. | Solvent | Coercive force of magnetic recording medium Hc⊥ (Oe) | Variation in coercive force of magnetic recording medium Hc⊥/Hc |
|---|---|---|---|
| (55) | 3 | 950 | 0.99 |
| (56) | 3 | 2383 | 1.00 |
| (57) | 1 | 2536 | 1.00 |
| (58) | 1 | 844 | 1.00 |
| (59) | 2 | 921 | 0.98 |
| (60) | 1 | 642 | 0.99 |
| (61) | 2 | 1958 | 1.01 |
| (62) | 2 | 459 | 0.99 |
| (63) | 3 | 713 | 0.99 |
| (64) | 3 | 735 | 0.99 |
| (65) | 1 | 562 | 1.00 |
| (66) | 3 | 764 | 1.02 |
| (67) | 3 | 961 | 0.99 |
| (68) | 1 | 1350 | 1.00 |
| (69) | 2 | 1243 | 0.99 |

TABLE 7

| Magnetic powder No. | Solvent | Coercive force of magnetic recording medium Hc⊥ (Oe) | Variation in coercive force of magnetic recording medium Hc⊥/Hc |
|---|---|---|---|
| (4) | 4 | 845 | 1.12 |
| (6) | 4 | 618 | 0.83 |
| (8) | 5 | 359 | 0.87 |
| (10) | 5 | 1134 | 1.29 |
| (11) | 4 | 1060 | 1.12 |
| (13) | 4 | 830 | 1.28 |
| (18) | 5 | 611 | 0.81 |
| (27) | 4 | 896 | 1.50 |
| (29) | 5 | 1106 | 0.77 |
| (30) | 4 | 733 | 0.85 |
| (43) | 4 | 596 | 1.10 |
| (48) | 4 | 623 | 0.88 |
| (50) | 5 | 458 | 1.47 |
| (52) | 5 | 511 | 1.14 |
| (56) | 4 | 2792 | 1.17 |
| (60) | 5 | 562 | 0.87 |
| (62) | 4 | 637 | 1.38 |
| (63) | 5 | 643 | 0.89 |

What is claimed is:

1. A method of producing a magnetic recording medium in which a magnetic coating formulation is prepared by dispersing and kneading a magnetic powder together with a dispersant, solvent, binder and one or more other additives, wherein said magnetic coating formulation containing a hexagonal ferrite magnetic powder is applied to the surface of a substrate and dried, characterized in that the hexagonal ferrite magnetic powder is represented by the following general composition formula (I) and has an average particle diameter of at most 0.1 μm, a ratio of the maximum diameter to the maximum thickness (a plate ratio) of at most 15, a particle size distribution ($\sigma$gd) of at most 3.4 in terms of the geometric standard deviation based on the number and a coercive force of 200–3,000 Oe, and a solvent containing at least 25 wt % of at least one ketone compound having at most 10 carbon atoms is used in the magnetic coating formulation $$(Fe)_a(Co)_b(M^1)_c(M^2)_d(M^3)_e(O)_f \qquad [I]$$

wherein $M^1$ means at least one metal element selected from Ba, Sr, Ca and Pb, $M^2$ denotes at least one metal element selected from Ti, Zr, Hf, Si, Ge, Sn, Mn, Mo, W, V, Ce, Nd, Sm, B and Nb, $M^3$ stands for at least one metal element selected from Mg, Ni, Cr, Cu, Zn, Cd, In, Ga, Bi, La, Y, P, Sb and Al, a, b, c, d, e and f respectively represent the numbers of Fe, Co, $M^1$, $M^2$, $M^3$ and O atoms, a is a number of 8.0 to 12.0, b is a number of 0 to 0.5, a ratio of b to a is at most 0.055, c, is a number of 0.3 to 6.0, d and e are individually a number of 0 to 6.0 with the proviso that when b is a number other than 0 and $M^2$ is Ti alone, e is a number other than o, d+e is a number of 0.1 to 8.0, and f is the number of oxygen atoms satisfying the atomic valences of the other elements.

2. The method of claim 1, wherein the hexagonal ferrite magnetic powder contains the individual components in such proportions that a is 8.0 to 12.0, b is a number of 0 to 0.4, a ratio of b to a is at most 0.05, c is a number of 0.3 to 4.0, d is a number of 0 to 4.0, e is a number of 0 to 4.0 with the proviso that when b is a number other than 0 and $M^2$ is Ti alone, e is a number other than 0, d +e is a number of 0.2 to 5.0, and f is the number of oxygen atoms satisfying the atomic valences of the other elements in the general composition formula [I].

3. The method of claim 1, wherein the hexagonal ferrite magnetic powder has a ratio of the maximum diameter to the maximum thickness (a plate ratio) of at most 10.

4. The method of claim 1, wherein the hexagonal ferrite magnetic powder has a particle size distribution ($\sigma$gd) of at most 3.1.

5. The method of claim 1, wherein the hexagonal ferrite magnetic powder is prepared in accordance with the coprecipitation-flux method.

6. The method of claim 1, wherein the solvent used in the magnetic coating formulation contains 15–90 wt. % of at least one ketone compound having at most 10 carbon atoms.

7. The method of claim 1, wherein said at least one ketone compound having at most 10 carbon atoms is selected from acetone, methyl ethyl ketone, methyl isobutyl ketone, cyclohexanone, methyl n-propyl ketone, diethyl ketone, hexanone-2, hexanone-3, di-n-propyl ketone, diisopropyl ketone, diisobutyl ketone, di-n-amyl ketone, acetylacetone, prone, cyclopentanone and cycloheptanone.

* * * * *